United States Patent
Wang et al.

(10) Patent No.: US 10,112,843 B2
(45) Date of Patent: Oct. 30, 2018

(54) USE OF POLYOLS AS SCALE CONTROL REAGENTS IN THE MINING PROCESSES

(71) Applicant: Nalco Company, Naperville, IL (US)

(72) Inventors: Jing Wang, Aurora, IL (US); Xiaojin Harry Li, Bartlett, IL (US); Heinrich Enoch Bode, Aurora, IL (US)

(73) Assignee: Ecolab USA Inc., St. Paul, MN (US)

( * ) Notice: Subject to any disclaimer, the term of this patent is extended or adjusted under 35 U.S.C. 154(b) by 32 days.

(21) Appl. No.: 14/992,382

(22) Filed: Jan. 11, 2016

(65) Prior Publication Data

US 2016/0122196 A1    May 5, 2016

Related U.S. Application Data

(63) Continuation of application No. 11/942,769, filed on Nov. 20, 2007.

(51) Int. Cl.
| | | |
|---|---|---|
| C01F 7/04 | (2006.01) | |
| C01F 7/06 | (2006.01) | |
| C01F 7/14 | (2006.01) | |
| C22B 1/00 | (2006.01) | |
| C22B 21/00 | (2006.01) | |
| C01F 7/47 | (2006.01) | |
| C02F 1/54 | (2006.01) | |

(52) U.S. Cl.
CPC ............ C01F 7/046 (2013.01); C01F 7/0646 (2013.01); C01F 7/144 (2013.01); C01F 7/47 (2013.01); C22B 1/00 (2013.01); C22B 21/0015 (2013.01); C02F 1/54 (2013.01); Y02P 10/234 (2015.11)

(58) Field of Classification Search
CPC ........ C01F 7/046; C01F 7/0646; C01F 7/144; C01F 7/47; C22B 1/00; C22B 21/0015; Y02P 10/234
See application file for complete search history.

(56) References Cited

U.S. PATENT DOCUMENTS

| | | | |
|---|---|---|---|
| 4,532,047 A | 7/1985 | Dubin | |
| 4,551,561 A | 11/1985 | Stühler | |
| 5,091,159 A | 2/1992 | Connelly et al. | |
| 5,106,599 A | 4/1992 | Roe | |
| 5,312,603 A | 5/1994 | Hachgenei et al. | |
| 5,346,511 A * | 9/1994 | Dimas | B01J 19/002 23/293 R |
| 5,630,985 A | 5/1997 | Williams et al. | |
| 5,716,530 A | 2/1998 | Strominger et al. | |
| 6,086,771 A | 7/2000 | Selvarajan et al. | |
| 6,765,082 B2 | 7/2004 | Sunder et al. | |
| 6,822,068 B2 | 11/2004 | Sunder et al. | |
| 2009/0082483 A1 * | 3/2009 | Petrovic | C07C 69/21 521/172 |

FOREIGN PATENT DOCUMENTS

| | | |
|---|---|---|
| DE | 4039053 A1 | 6/1992 |
| EP | 0327660 A1 | 8/1989 |
| EP | 0465055 A1 | 1/1992 |
| WO | WO 99/29626 A1 | 6/1999 |

OTHER PUBLICATIONS

Andrzej Dworak, Polyglycidol—how is it synthesized and what is it used for?, 2013, Polimery, 58, 641-649.*
Tween 20 Sigma-Aldrich Reference Sheet (https://www.sigmaaldrich.com/catalog/product/sial/p1379?lang=en&region=US).*
U.S. Appl. No. 11/942,769, filed Nov. 20, 2007.
Kainthan et al. "Synthesis, Characterization, and Viscoelastic Properties of High Molecular Weight Hyperbranched Polyglycerols," *Macromolecules*, (2006), 39, pp. 7708-7717.
Kildea et al., "Scale control and prevention of hydrate precipitation in red mud filters," *Light Metals*, (2000), pp. 105-110.
Smith et al., "The effects of model organic compounds of gibbsite crystallization from alkaline aluminate solutions," *Polyols*, (1996), 111, Elsevier, pp. 119-130.
Sunder et al., "Controlled Synthesis of Hyperbranched Polyglycerols by Ring-Opening Multibranching Polymerization," *Macromolecules*, (1996), 32, pp. 4240-4246.
Sunder et al., "Chiral Hyperbranched Dendron-Analogs," *Macromolecules*, (2000), 33, pp. 253-254.
Watling et al., "Gibbsite crystallization inhibition 1. Effects of sodium gluconate on nucleation, agglomeration and growth," *Hydrometallurgy*, (2000), 55, pp. 275-288.
Watling, "Gibbsite crystallization inhibition 2. Comparative effects of selected alditols and hydroxycarboxylic acids," *Hydrometallurgy*, (2000), 55, pp. 289-309.

* cited by examiner

*Primary Examiner* — James Fiorito
(74) *Attorney, Agent, or Firm* — Leydig, Voit & Mayer, Ltd.

(57) ABSTRACT

In the mining process, linear, branched, hyperbranched or dendrimeric polyols or mixtures thereof are employed as process stabilization aids for aqueous solutions and, or suspensions of metal salts. A specific application area of the polyols is the stabilization of bauxite liquor in the Bayer process of producing alumina from bauxite.

6 Claims, No Drawings

USE OF POLYOLS AS SCALE CONTROL REAGENTS IN THE MINING PROCESSES

CROSS-REFERENCE TO RELATED APPLICATION

This application is a continuation of pending U.S. patent application Ser. No. 11/942,769, which was filed Nov. 20, 2007, the disclosure of which is incorporated herein by reference in its entirety.

COPYRIGHT NOTICE

A portion of the disclosure of this patent document contains or may contain copyright protected material. The copyright owner has no objection to the photocopy reproduction by anyone of the patent document or the patent disclosure in exactly the form it appears in the Patent and Trademark Office patent file or records, but otherwise reserves all copyright rights whatsoever.

TECHNICAL FIELD

This invention relates to the use of linear, branched, hyperbranched or dendrimeric polyols or mixtures thereof as process stabilization aids for aqueous solutions and, or suspensions of metal salts in the mining processes. The primary mode of action of the polyols is as solution and, or suspension stabilizer, which can be achieved by modification of crystal growth process, threshold inhibition and solids dispersion. The polyol processing aids interact with the dissolved or suspended salts in such a way as to alter their dissolution and, or precipitation process as compared to the unaided process.

Salts containing aluminum, arsenic, beryllium, cadmium, calcium, chromium, cobalt, copper, iron, mercury, magnesium, nickel, lead, scandium, selenium, silicon, tin, tellurium, titanium, and zinc are the primary salts considered for which the described polyols have a stabilization effect under aqueous conditions in the mining processes.

A specific application area of the polyols is the stabilization (scale control filtration aid) of Bayer bauxite liquor in the Bayer process.

BACKGROUND

Various industrial process employ aqueous solutions that have salt concentration above their natural solubility. Systems using these solutions are often prone to foul which is due to the natural tendency of the dissolved minerals to form precipitates that settle in inopportune places or adhere to surfaces that should stay clean. Process additives have been developed to overcome these problems. Organic compounds containing sulfonate and other functionalities have for example stabilized waters in steam generators. Organo phosphonates and poly carboxylates are known stabilizers for cooling water systems. Polyols with a molecular weight at or below 500 have been used as corrosion and deposition inhibitors in cooling water systems.

The Bayer process is a specific application area where a metal salt is processed under alkaline aqueous conditions. In the typical Bayer process for the production of alumina, bauxite ore is pulverized, slurried in water, and then digested with caustic at elevated temperatures and pressures. The caustic solution dissolves oxides of aluminum, forming an aqueous sodium aluminate solution. The caustic insoluble constituents of bauxite ore are then separated from the aqueous phase containing the dissolved sodium aluminate. Solid alumina trihydrate is precipitated out of the solution and collected as product.

In detail, the pulverized bauxite ore may be fed to a slurry mixer where an aqueous slurry is prepared. The slurry makeup water is typically spent liquor (described below) and added caustic. This bauxite ore slurry is then diluted and passed through a digester or a series of digesters where, under high pressure and temperature, about 98% of the total available alumina is released from the ore as caustic-soluble sodium aluminate. The digested slurry is then cooled from about 200° C. to about 105° C., employing a series of flash tanks wherein heat and condensate are recovered. The aluminate liquor leaving the flashing operation often contains from about 1 to about 20 weight percent solids, saidsolids consist of the insoluble residue that remains after, or is precipitated during, digestion. The coarser solid particles may be removed from the aluminate liquor with a "sand trap" cyclone or other means. The finer solid particles may be separated from the liquor first by settling and then by filtration, if necessary. The slurry of aluminate liquor leaving the flash tanks is diluted by a stream of recycled washer overflow liquor. Any Bayer process slurry taken from the digesters through any subsequent dilution of the slurry, including the flash tanks, but before the primary settler, is referred hereinafter as the primary settler feed.

The primary settler feed is then fed to the center well of the primary settler, where it is treated with a flocculant. As the mud settles, clarified sodium aluminate solution referred to as "green" or "pregnant" liquor, overflows from the primary settling tank and is passed to the subsequent process steps. The aluminate liquor would then generally be further clarified by filtration to give a filtrate with no more than about 10 mg suspended solids per liter of liquor if it contains an unacceptable concentration of suspended solids (at times from about 10 to about 500 mg of suspended solids per liter). During this process, one of the biggest losses in the aluminum refinery plants is auto-precipitation of aluminate across the thickners, washers and the filtration steps. Conventional technology employs the addition of water continuous emulsion polymers or biopolymers for scale control and prevention of this precipitation process. In addition, sodium gluconate, glycerine and other low molecular weight polyols were found to distinctly inhibit the crystallization of aluminum trihydrate. Polyglycerols have been used in the Bayer process to increase the crystal size of aluminum trihydrate at the precipitation stage.

In past work, mono- or polyhydric alcohols with a molecular weight below 500 were also used for the inhibition of corrosion and deposit formation in cooling water systems. It was found that in other industrial water applications low molecular weight (below 500) polypolar organic compound containing hydroxyl and/or primary amino functional groups inhibit amorphous silica scale formation.

Polyols such as glycerol, pentaerythritol, mannitol, and sorbitol as well as polyols based on glycerol have been used in cement slurries as process aids, retarders, and flow improvers.

SUMMARY OF THE INVENTION

In this invention, it is found that linear, branched, hyperbranched and dendrimeric polyols with molecular weight of 500 up to 1,000,000 perform effectively in improving the stability of the aluminate in Bayer liquor. This improvement can reduce hydrate precipitation in the filters and operating vessels, which in turn reduces the associated maintenance issues. Furthermore, since an improved stability of aluminate in bauxite liquor can directly inhibit precipitation, it may allow increased uptake of alumina values in digestion and directly lead to increased production yield. With regard to the synthesis of linear and branched polyols, they are obtained by condensation of monomeric compounds. A generic structure of the used monomeric compounds is shown below.

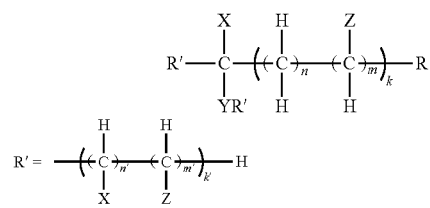

n, n' = 0, 1, 2, 3, ...
m, m' = 0, 1, 2, 3, ...
k, k' = 0, 1, 2, 3, ...

The preferred substituent for X is hydroxide other incidental substituents can be among others hydrogen, amines, thiols, carboxylates (in salt, acid, or ester form), sulfonates (in salt, acid, or ester form) and amides.

The preferred linker for Y is oxygen other potential tinker bonds can be among others made by nitrogen, sulfur, sulfoxide, sulfone, ester, and amide functionalities as well as by single or multiple methylene units.

The preferred substituent for Z is hydroxide or hydrogen other incidental substituents can be among others, amines, thiols, carboxylates (in salt, acid, or ester form), sulfonates (in salt, acid, or ester form) and amides.

The preferred substituent R is one or a combination of the following, hydrogen, methyl, hydroxide, other incidental substituents may be amines, thiols, carboxylates (in salt, acid, or ester form), sulfonates (in salt, acid, or ester form) and amides.

Expanding on above generic structure for the monomers some specific examples include: ethylene glycol, diethylene glycol, triethylene glycol, polyethylene glycol, 1,2-propylene glycol, dipropylene glycol, polypropylene glycol, 1,4-butanediol, pentamethylene glycol, hexamethylene glycol, catechol, resorcinol, hydroquinone, bisphenol A, 1,1,1-tris(hydroxymethyl)methane, 1,1,1-tris(hydroxymethyl)ethane, 1,1,1-tris(hydroxyrnethyl)propane, 1,3,5-benzenetriol, 1,2,4-benzenetriol, glycerol, glyceric acid, threitol, erythritol, meso-erythritol, iso-erythritol, butanetetrol, tetritol, threonic acid, erythronic acid, ribitol, arabinitol, xylitol, pentitol, ribonic acid, sorbitol, mannitol, allitol, altritol, hexitol, glucitol, galcitol, ducitol, gluconic acid, mannonic acid, mannose, galactose, pyranose, furanose, glucose and tartrate.

Other monomeric compounds which contain functionalizable groups are allyl glycerol, chloropropanediols, dichloropropanols, epichlorohydrin, cane sugar, degraded starch and cellulose.

Condensation of the monomeric compounds can be carried out in such a way as to give homo-polymers from a single monomer, copolymers from two monomers as random copolymer or block copolymer, or terpolymer from three monomers, again in the variations of random terpolymer or block terpolymer.

With regard to the synthesis of hyperbranched as well as branched polyols, they are obtained by addition polymerization, mostly base-catalyed, of an epoxide or an epoxide equivalent in the presence of a hydrogen active starter or initiator. Compounds having molecular weights from 17 to 50,000 and preferred range of 17 to 4,000 are used as initiators capable of polymerizing monomers to a polyol or polyol derivative.

Examples of hydrogen active initiators include alcohols, amines, thiols.

Examples of alcohols are methanol, ethanol, butanol, phenol, water, ethylene glycol, diethylene glycol, triethylene glycol, polyethylene glycol, 1,2-propylene glycol, dipropylene glycol, polypropylene glycol, 1,4-butanediol, hexamethylene glycol, bisphenol A, trimethylolpropane, glycerol, pentaerythritol, mannose, galactose, pyranose, furanose, glucose, sorbitol, mannitol, arabinitol, meso-erythritol, xylitol, threitol, ribitol, glyceric acid, erythronic acid, threonic acid, ribonic acid, gluconic acid, mannonic acid, as well as compounds which contain other functionalisable hydroxide starter groups such as allyl glycerol, hydrogen active intiators, 10-undecenol, and tartrate. An unique class of hydrogen active initiators on alcohol basis are polysaccharides. A non all-inclusive list of potential polysaccharide starter molecules contains the following polysaccharides: alginin, amylopectin, amylase, alpha-cellulose, hemi-cellulose, chitin, chitosan, dextran, glycogen, guar, inulin, pectin, xanthurn gum, cane sugar, degraded starch, and cellulose.

Examples of amines are ammonia, methylamine, ethylamine, propylamine, butylamine, stearylamine, 10-undecenylamine, dibenzylamine, aniline, benzylamine, o- and p-toluidine, α,β-naphthylamine, ethylenediamine, propylenediamine, 1,4-butylenediamone, 1,2-, 1,3-, 1,4-, 1,5- or 1,6-hexamethylenediamine, o-, m- and p-phenylenediamine, 2,4-, 2,6-tolylenediamine, 2,2', 2,4- and 4,4'-diaminodiphenylmethane and diethylenetriamine.

Examples of thiols are hydrogen sulfide, methanethiol, ethane thiol and 1,2-ethanedithiol The synthesis of hyperbranched as well as branched polyols by addition polymerization is obtained from one, two or multiple epoxides or equivalents thereof.

Examples of them are glycidol, allyl glycidyl ether, ethylene oxide, propylene oxide, butylene oxide, vinyl oxirane, chloropropanols, dichloropropanols and epichlorohydrin With regard to the definition of hyperbranched polyols, the synthesis and definition of their molecular weight and their degree of branching, as well as the determination of the latter, reference is made to the publications by Sunder A. et al and concerning high molecular weight highly branched polyols Kainthan R. et al.

The synthesis of polyol dendrimer is based on a simple iterative two-step protocol that involves allylation of an ally alcohol and subsequent catalytic dihydroxylation of the allylic double bond. The present invention essentially relates to those polyols consisting of 25 to 12000, preferably 42 to 7200 repeating units of the above monomeric compounds.

The preferred polyol in the process is a polyglycerol of either linear or branched structure. The polyols used pursuant to the invention, may also be polysorbitol, polydextrose, polyvinyl alcohol derivatives etc. The polyol of the invention may be added to the Bayer process at a variety of dosages. Typically the range will be between 0.1-100 ppm. At preferred embodiment good results are frequently achieved using from 5-50 ppm.

The invention is illustrated by the proceeding descriptions and the following examples which are not meant to limit the invention unless otherwise stated in the claims appended hereto.

DETAILED DESCRIPTION

The present invention claims a method for increasing stability in process salt solutions of mining systems by adding to the solution an effective amount of polyol, distributing the polyol through the solution; and stabilizing the salt in the process solution. The invention further involves the use of a pregnant liquor from the Bayer process. The method for improving aluminate stability in pregnant liquor comprising adding to the pregnant liquor an effective amount of polyol, distributing the polyol through the pregnant liquor; and stabilizing the aluminate in the pregnant liquor.

The invention as claimed wherein the polyol contains 5 to 30 milli equivalents of hydroxyl units per gram of active polymer, preferably 8 to 18 milli equivalents of hydroxyl units per gram of active polymer. The invention wherein the polyol is linear, branched, hyperbranched or dendrimeric.

The polyol of the claimed invention is synthesized by an addition polymerization or a condensation polymerization preferably from 25 to 12,000 monomeric units and most preferably from 42 to 7,200 monomeric units.

The claimed invention further includes a polyol which maybe is synthesized from a single monomer or a combination of multiple monomers wherein the monomers can be organized randomly or in discrete blocks or groups and the polyol has a molecular weight of 500 up to 1,000,000. The invention wherein the polyol is a linear polyglycerol, branched polyglycerol, hyper-branched polyglycerol, dendrimeric polyglycerol, a linear polysorbitol, branched polysorbitol, hyper-branched polysorbitol or a dendrimeric polysorbitol.

The invention when used in the Bayer process is effective when the pregnant Bayer liquor has no less than 0.1 ppm, preferably the pregnant Bayer liquor is at 0.1 to 100 ppm and most preferably the pregnant Bayer liquor is at 5 to 50 ppm.

EXAMPLES

The foregoing may be better understood by reference to the following examples, which are intended to illustrate methods for carrying out the invention and are not intended to limit the scope of the invention.

It should be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

Example Test Product Descriptions

| | |
|---|---|
| A | Dextran |
| B | Polysaccharide Derivative |
| C | Polysaccharide Derivative |
| D | Polysaccharide Derivative |
| E | Polyvinyl alcohol (PVA) Derivative |
| F | Hyperbranched Polyglycerol |
| G | Partly branched Polyglycerol |
| H | Partly branched Polyglycerol |
| I | Partly branched Polyglycerol |
| J | Polydextrose |
| K | Partly branched Polyglycerol (low molecular weight) |
| L | Partly branched Polyglycerol (low molecular weight) |
| M | Partly branched Polyglycerol (low molecular weight) |
| N | Partly branched Polyglycerol (medium molecular weight) |
| O | Partly branched Polyglycerol (high molecular weight) |
| P | Partly branched Polyglycerol (high molecular weight) |
| Q | Hyperbranched Polyglycerol (high molecular weight) |
| R | Hyperbranched Polyglycerol (high molecular weight) |
| S | Hyperbranched Polyglycerol (high molecular weight) |
| T | Hyperbranched Polyglycerol (high molecular weight) |
| U | Hyperbranched Polyglycerol (low molecular weight) |
| V | Hyperbranched Polyglycerol (low molecular weight) |

Example 1

Tests were conducted to examine the effect of polysaccharide derivatives (A, B, C, D), PVA derivative (E) and polyglycerol (F) on the control of liquor stability (alumina loss and scaling rate). The tests utilized Bayer pregnant liquor prepared via dissolving a certain amount of aluminum trihydrates into spent liquor to obtain the desired starting A/C (aluminum to caustic ratio). Liquor stabilization reagents were pre-dosed into 250 ml Nalgene bottles. Then 200 ml prepared liquor was decanted into each of the bottles, which were subsequently rotated at 80° C. in a water bath for approximately 29 hours. At specific time intervals over this test period, 10 ml of liquor was sampled from each bottle and analyzed for A/C. The results (Table 1) showing A/C breakpoints were obtained. As shown in table 1, it is apparent that the A/C of the blank (without polymer addition) dropped dramatically within the 20 hr period. The liquors dosed with PVA derivative (E) behaved slightly better than the blank. However, the A, B, C, D and F dosed samples can hold A/C for 20 hours. In addition, the addition of 10 ppm A, 10 ppm C, 20 ppm D and 54 ppm F can keep the A/C constant over the whole 29 hr period. But for the 10 ppm B dosed sample, the A/C start to drop after 20 hours.

TABLE 1

A/C decomposition for prepared bauxite liquor as a function of time with or without reagents

| Product | Polymer Dose, ppm | A/C (0 hr) | A/C (3 hrs) | A/C (20 hrs) | A/C (24 hrs) | A/C (29 hrs) |
|---|---|---|---|---|---|---|
| Blank | 0 | 0.695 | 0.696 | 0.614 | 0.577 | 0.541 |
| A | 10.43 | 0.695 | 0.696 | 0.698 | 0.692 | 0.694 |
| F | 54.00 | 0.695 | 0.696 | 0.688 | 0.694 | 0.693 |
| E | 12.50 | 0.695 | 0.695 | 0.675 | 0.610 | 0.551 |
| C | 10.00 | 0.695 | 0.696 | 0.695 | 0.691 | 0.686 |
| B | 10.00 | 0.695 | 0.696 | 0.688 | 0.670 | 0.606 |
| D | 20.00 | 0.695 | 0.695 | 0.696 | 0.693 | 0.694 |

Example 2

Tests were conducted to examine the effect of polysaccharide derivatives (A and C), different polyglycerols (F, G and H) and polydextrose J on the control of liquor stability (alumina loss and scaling rate). The tests utilized Bayer pregnant liquor prepared via dissolving a certain amount of aluminum trihydrate into spent liquor to obtain the desired starting A/C (aluminum to caustic ratio). Liquor stabilization reagents were pre-dosed into 250 ml Nalgene bottles. Then 200 ml prepared liquor was decanted into each of the bottles, which were subsequently rotated at 55° C. in a water bath for approximately 27 hours. At specific time intervals over this test period, 10 mls of liquor was sampled from each bottle and analyzed for A/C. As shown in Table 2, the A/C of the blank (without polymer addition) dropped significantly within a 27 hr period. The liquor dosed with 10.43 ppm A behaved similarly to the blank. The A/C of J dosed liquor dropped slightly after 22 hrs. However, the addition of C, G, F and H can keep the A/C constant over the whole 27 hr period.

TABLE 2

A/C decomposition for prepared bauxite liquor as a function of time with or without reagents

| Product | Polymer Dose, ppm | 0 hr | 3 hrs | 19 hrs | 22 hrs | 25 hrs | 27 hrs |
|---|---|---|---|---|---|---|---|
| Blank | 0 | 0.726 | 0.725 | 0.719 | 0.693 | 0.661 | 0.643 |
| A | 10.43 | 0.726 | 0.725 | 0.719 | 0.707 | 0.676 | 0.660 |
| G | 13.50 | 0.726 | 0.725 | 0.724 | 0.726 | 0.724 | 0.723 |
| F | 13.50 | 0.726 | 0.725 | 0.724 | 0.727 | 0.727 | 0.727 |
| J | 13.50 | 0.726 | 0.725 | 0.723 | 0.724 | 0.716 | 0.705 |
| H | 13.50 | 0.726 | 0.726 | 0.723 | 0.725 | 0.723 | 0.721 |
| C | 10.00 | 0.726 | 0.726 | 0.724 | 0.726 | 0.727 | 0.726 |

Example 3

Tests were conducted to examine the effect of dosage of polyglycerols (F, G and H) on the control of liquor stability (alumina loss and scaling rate). The tests utilized Bayer pregnant liquor prepared via dissolving a certain amount of aluminum trihydrate into spent liquor to obtain the desired starting A/C (aluminum to caustic ratio). Liquor stabilization reagents were pre-dosed into 250 ml Nalgene bottles. Then 200 ml prepared liquor was decanted into each of the bottles, which were subsequently rotated at 55° C. in a water bath for approximately 28 hours. At specific time intervals over this test period, 10 mls of liquor was sampled from each bottle and analyzed for A/C. As shown in Table 3, the A/C of the blank (without polymer addition) dropped significantly within a 28 hr period. The liquors dosed with 10.43 ppm A, 0.54 ppm G and 0.54 ppm H behaved similarly to the blank. For H, the performance was slightly improved with an increase of dosage from 0.54 ppm to 2.16 ppm. For G dosed liquors, A/C was increased as dosage increased. Moreover, the addition of 0.54, 2.16 and 5.4 ppm F can keep the A/C constant over 25 hr period.

TABLE 3

A/C decomposition for prepared bauxite liquor as a function of time with or without reagents at different dosages

| Product | Polymer Dose, ppm | 0 hr | 4 hrs | 20 hrs | 23 hrs | 25.5 hrs | 28 hrs |
|---|---|---|---|---|---|---|---|
| Blank | 0 | 0.748 | 0.750 | 0.715 | 0.683 | 0.639 | 0.606 |
| A | 10.43 | 0.748 | 0.750 | 0.722 | 0.695 | 0.655 | 0.623 |
| G | 0.54 | 0.748 | 0.750 | 0.725 | 0.694 | 0.646 | 0.611 |
| F | 0.54 | 0.748 | 0.750 | 0.748 | 0.747 | 0.744 | 0.697 |
| H | 0.54 | 0.748 | 0.750 | 0.708 | 0.676 | 0.637 | 0.605 |
| G | 2.16 | 0.748 | 0.750 | 0.736 | 0.708 | 0.659 | 0.622 |
| F | 2.16 | 0.748 | 0.750 | 0.749 | 0.749 | 0.749 | 0.750 |
| H | 2.16 | 0.748 | 0.750 | 0.726 | 0.693 | 0.642 | 0.605 |
| G | 5.40 | 0.748 | 0.750 | 0.735 | 0.707 | 0.661 | 0.624 |
| F | 5.40 | 0.748 | 0.750 | 0.749 | 0.750 | 0.749 | 0.749 |
| H | 5.40 | 0.748 | 0.750 | 0.720 | 0.692 | 0.657 | 0.626 |

Example 4

Further tests were conducted to examine the effect of bauxite addition on the liquor stability (LS) control with polyglycerols using bauxite spent liquor as initial liquor. The tests utilized Bayer pregnant liquor prepared via dissolving a certain amount of aluminum trihydrate into spent liquor to obtain the desired starting A/C (aluminum to caustic ratio). Liquor stabilization reagents were pre-dosed into 250 ml Nalgene bottles. Then 200 ml prepared liquor was decanted into each of the bottles, which were subsequently rotated at 70° C. in a water bath. After 30 minutes, 0.1 g bauxite powder was added into each bottle. At specific time intervals over this test period, 10 mls of liquor was sampled from each bottle and analyzed for A/C. As the results shown in Table 4, for the liquor with 0.5 g/l bauxite, the A/C of the blank (without polymer addition) dropped significantly within a 16 hr period. The liquors dosed with A, G, I and H behaved similarly to the blank. For F dosed liquor, at 70° C., A/C stay constant over 20 hrs.

TABLE 4

A/C decomposition for prepared bauxite liquor as a function of time with or without reagents at different dosages

| Product | Polymer Dose, ppm | 0 hr | 1 hrs | 16 hrs | 18 hrs | 20 hrs | 24 hrs |
|---|---|---|---|---|---|---|---|
| Blank | 0 | 0.710 | 0.708 | 0.682 | 0.670 | 0.658 | 0.631 |
| A | 10.43 | 0.710 | 0.709 | 0.684 | 0.671 | 0.656 | 0.629 |
| G | 5.40 | 0.710 | 0.708 | 0.684 | 0.674 | 0.657 | 0.634 |
| F | 5.40 | 0.710 | 0.710 | 0.710 | 0.710 | 0.705 | 0.707 |
| I | 10.80 | 0.710 | 0.710 | 0.685 | 0.675 | 0.658 | 0.632 |
| G | 10.80 | 0.710 | 0.709 | 0.677 | 0.665 | 0.648 | 0.621 |
| F | 10.80 | 0.710 | 0.710 | 0.710 | 0.710 | 0.706 | 0.707 |
| H | 10.80 | 0.710 | 0.709 | 0.688 | 0.676 | 0.661 | 0.636 |
| G | 21.60 | 0.710 | 0.709 | 0.672 | 0.656 | 0.643 | 0.615 |
| F | 21.60 | 0.710 | 0.710 | 0.710 | 0.706 | 0.707 | 0.707 |
| H | 21.60 | 0.710 | 0.709 | 0.672 | 0.654 | 0.643 | 0.613 |
| A | 20.85 | 0.710 | 0.709 | 0.685 | 0.669 | 0.657 | 0.630 |

Example 5

Further tests were conducted to examine the effect of bauxite addition on the liquor stability (LS) control with polyglycerols using bauxite spent liquor as initial liquor. The tests utilized Bayer pregnant liquor prepared via dissolving a certain amount of aluminum trihydrate into spent liquor to obtain the desired starting A/C (aluminum to caustic ratio). Liquor stabilization reagents were pre-dosed into 250 ml Nalgene bottles. Then 200 ml prepared liquor was decanted into each of the bottles, which were subsequently rotated at 55° C. in a water bath. After 30 minutes, 0.1 g bauxite powder was added into each bottle. At specific time intervals over this test period, 10 mls of liquor was sampled from each bottle and analyzed for A/C. As the results shown in Table 5, for the liquor with 0.5 g/l bauxite, the A/C of the 10.8 ppm F dosed liquor started to drop after 4.5 hrs. As the increase of F dosage from 10.8 ppm to 21.6 ppm, the liquor was stabilized over the whole 8.75 hr period.

TABLE 5

A/C decomposition for prepared bauxite liquor as a function of time with or without reagents at different dosages

| Product | Polymer Dose, ppm | 0 hr | 1.5 hrs | 4.5 hrs | 6 hrs | 7.25 hrs | 8.75 hrs |
|---|---|---|---|---|---|---|---|
| Blank | 0 | 0.728 | 0.728 | 0.720 | 0.707 | 0.688 | 0.671 |
| A | 10.43 | 0.728 | 0.728 | 0.725 | 0.706 | 0.696 | 0.677 |
| I | 10.80 | 0.728 | 0.728 | 0.722 | 0.705 | 0.690 | 0.669 |
| G | 10.80 | 0.728 | 0.729 | 0.722 | 0.705 | 0.689 | 0.671 |
| F | 10.80 | 0.728 | 0.729 | 0.727 | 0.717 | 0.704 | 0.689 |

TABLE 5-continued

A/C decomposition for prepared bauxite liquor as a function of time with or without reagents at different dosages

| Product | Polymer Dose, ppm | 0 hr | 1.5 hrs | 4.5 hrs | 6 hrs | 7.25 hrs | 8.75 hrs |
|---|---|---|---|---|---|---|---|
| H | 10.80 | 0.728 | 0.728 | 0.725 | 0.710 | 0.694 | 0.677 |
| G | 21.60 | 0.728 | 0.729 | 0.720 | 0.694 | 0.683 | 0.662 |
| F | 21.60 | 0.728 | 0.729 | 0.730 | 0.727 | 0.729 | 0.725 |
| H | 21.60 | 0.728 | 0.729 | 0.721 | 0.704 | 0.690 | 0.667 |
| A | 20.85 | 0.728 | 0.729 | 0.722 | 0.697 | 0.688 | 0.665 |

Example 6

Further tests were conducted to examine the effect of bauxite addition on the liquor stability (LS) control with polyglycerols using bauxite spent liquor as initial liquor. The tests utilized Bayer pregnant liquor prepared via dissolving a certain amount of aluminum trihydrate into spent liquor to obtain the desired starting A/C (aluminum to caustic ratio). Liquor stabilization reagents were pre-dosed into 250 ml Nalgene bottles.

Then 200 ml prepared liquor was decanted into each of the bottles, which were subsequently rotated at 70° C. in a water bath. After 30 minutes, 0.4 g bauxite powder was added into each bottle. At specific time intervals over this test period, 10 mls of liquor was sampled from each bottle and analyzed for A/C. As the results show in Table 6, for the blank liquor with 2 g/l bauxite, the liquor starts to break immediately after solid addition. The addition of A, G, I and H cannot hold the A/C from dropping. But the 21.6 ppm F dosed liquor can hold A/C up to 4.5 hours.

TABLE 6

A/C decomposition for prepared bauxite liquor as a function of time with or without reagents at different dosages

| Product | Polymer Dose, ppm | 0 hr | 1.5 hrs | 2.75 hrs | 4.5 hrs | 6.25 hrs | 8 hrs |
|---|---|---|---|---|---|---|---|
| Blank | 0 | 0.709 | 0.689 | 0.661 | 0.639 | 0.619 | 0.610 |
| A | 10.43 | 0.709 | 0.690 | 0.670 | 0.650 | 0.628 | 0.613 |
| I | 21.60 | 0.709 | 0.688 | 0.668 | 0.647 | 0.626 | 0.611 |
| G | 10.80 | 0.709 | 0.689 | 0.670 | 0.649 | 0.628 | 0.611 |
| F | 10.80 | 0.709 | 0.701 | 0.691 | 0.670 | 0.655 | 0.639 |
| H | 10.80 | 0.709 | 0.690 | 0.669 | 0.647 | 0.625 | 0.608 |
| G | 21.60 | 0.709 | 0.691 | 0.670 | 0.649 | 0.628 | 0.611 |
| F | 21.60 | 0.709 | 0.704 | 0.706 | 0.710 | 0.698 | 0.676 |
| H | 21.60 | 0.709 | 0.693 | 0.670 | 0.648 | 0.626 | 0.609 |
| A | 20.85 | 0.709 | 0.692 | 0.670 | 0.648 | 0.627 | 0.613 |

Example 7

Further tests were conducted to examine the effect of solid loading on the liquor stability (LS) control with polyglycerols using bauxite spent liquor as initial liquor. The tests utilized Bayer pregnant liquor prepared via dissolving a certain amount of aluminum trihydrate into spent liquor to obtain the desired starting A/C (aluminum to caustic ratio). Liquor stabilization reagents were pre-dosed into 250 ml Nalgene bottles. Then 200 ml prepared liquor was decanted into each of the bottles, which were subsequently rotated at 70° C. in a water bath. After 30 minutes, 0.01 g bauxite powder was added into each bottle. At specific time intervals over this test period, 10 mls of liquor was sampled from each bottle and analyzed for A/C. As the results show in Table 7, for the liquor with 0.05 g/l bauxite, the A/C of the blank (without polymer addition) dropped significantly within a 24 hr period. For F dosed liquor, at 70° C., A/C stays constant over 24 hrs. However, the A/C of the 10.8 ppm A, G, I and H (10 ppm and 20 ppm) dosed liquor started to drop after 16 hrs. As the dosage of A and G increases from 10.8 ppm to 21.6 ppm, the liquor was stabilized over an 18 hr period.

TABLE 7

A/C decomposition for prepared bauxite liquor as a function of time with or without reagents at different dosages

| Product | Polymer Dose, ppm | 0 hr | 1 hrs | 16 hrs | 18 hrs | 20 hrs | 24 hrs |
|---|---|---|---|---|---|---|---|
| Blank | 0 | 0.731 | 0.729 | 0.707 | 0.692 | 0.681 | 0.634 |
| A | 10.43 | 0.731 | 0.729 | 0.705 | 0.702 | 0.685 | 0.645 |
| I | 10.80 | 0.731 | 0.729 | 0.718 | 0.708 | 0.690 | 0.648 |
| G | 10.80 | 0.731 | 0.728 | 0.713 | 0.703 | 0.686 | 0.651 |
| F | 10.80 | 0.731 | 0.729 | 0.722 | 0.728 | 0.728 | 0.728 |
| H | 10.80 | 0.731 | 0.728 | 0.713 | 0.705 | 0.690 | 0.655 |
| G | 21.60 | 0.731 | 0.728 | 0.717 | 0.717 | 0.705 | 0.671 |
| F | 21.60 | 0.731 | 0.728 | 0.727 | 0.730 | 0.729 | 0.726 |
| H | 21.60 | 0.731 | 0.727 | 0.714 | 0.709 | 0.696 | 0.664 |
| A | 20.85 | 0.731 | 0.727 | 0.718 | 0.716 | 0.706 | 0.677 |

Example 8

Further tests were conducted to examine the effect of molecular weight of partially branched polyglycerols on the liquor stability (LS) control using bauxite spent liquor as initial liquor. The tests utilized Bayer pregnant liquor prepared via dissolving a certain amount of aluminum trihydrate into spent liquor to obtain the desired starting A/C (aluminum to caustic ratio). Liquor stabilization reagents were pre-dosed into 250 ml Nalgene bottles. Then 200 ml prepared liquor was decanted into each of the bottles, which were subsequently rotated at 70° C. in a water bath. After 30 minutes, 0.01 g bauxite powder was added into each bottle. At specific time intervals over this test period, 10 mls of liquor was sampled from each bottle and analyzed for A/C. As the results show in Table 8, the A/C of the blank (without polymer addition) dropped significantly within a 24 hr period. In addition, the stabilization efficiency of polyglycerols was increased as the increase of molecular weight (from 200 of K to 100,000 of O) and reached a plateau between O and P.

TABLE 8

A/C decomposition for prepared bauxite liquor as a function of time with or without polyglycerols of different MW

| Product | Polymer Dose, ppm | 0 hr | 1 hrs | 16 hrs | 18 hrs | 20 hrs | 24 hrs |
|---|---|---|---|---|---|---|---|
| Blank | 0 | 0.736 | 0.738 | 0.675 | 0.660 | 0.639 | 0.593 |
| A | 20.85 | 0.736 | 0.739 | 0.693 | 0.676 | 0.655 | 0.608 |
| F | 10.80 | 0.736 | 0.739 | 0.739 | 0.738 | 0.738 | 0.739 |
| K | 20.00 | 0.736 | 0.738 | 0.674 | 0.661 | 0.641 | 0.597 |
| L | 20.00 | 0.736 | 0.737 | 0.714 | 0.702 | 0.686 | 0.643 |
| M | 20.00 | 0.736 | 0.736 | 0.712 | 0.703 | 0.689 | 0.656 |
| N | 20.00 | 0.736 | 0.737 | 0.719 | 0.714 | 0.699 | 0.660 |
| O | 20.00 | 0.736 | 0.737 | 0.729 | 0.727 | 0.720 | 0.690 |
| P | 20.00 | 0.736 | 0.737 | 0.729 | 0.726 | 0.721 | 0.690 |
| A | 34.75 | 0.736 | 0.736 | 0.729 | 0.725 | 0.718 | 0.688 |

Example 9

Further tests were conducted to examine the effect of molecular weight of hyperbranched polyglycerols on the liquor stability (LS) control with polyglycerols using bauxite spent liquor as initial liquor. The tests utilized Bayer pregnant liquor prepared via dissolving a certain amount of aluminum trihydrate into spent liquor to obtain the desired starting A/C (aluminum to caustic ratio). Liquor stabilization reagents were pre-dosed into 250 ml Nalgene bottles. Then 200 ml prepared liquor was decanted into each of the bottles, which were subsequently rotated at 70° C. in a water bath. After 30 minutes, 0.01 g bauxite powder was added into each bottle. At specific time intervals over this test period, 10 mls of liquor was sampled from each bottle and analyzed for A/C. As the results show in Table 9, for the blank liquor with 0.05 g/l bauxite, the A/C dropped significantly within a 24 hr period. Compared to A, the addition of hyperbranched polyglycerols with Mw of 1000-50,000(U, V) significantly improved the liquor stability at a much lower dosage. Moreover, for the high MW hyperbranched polyglycerols (Q,S,R,T, MW:50,000-1,000,000), they performed better than A at the same dosage.

TABLE 9

A/C decomposition for prepared bauxite liquor as a function of time with or without hyperbranched polyglycerols of different MW

| Product | Polymer Dose, ppm | 1 hrs | 17 hrs | 19 hrs | 22 hrs | 24 hrs |
|---|---|---|---|---|---|---|
| Blank | 0 | 0.730 | 0.680 | 0.667 | 0.645 | 0.633 |
| A | 20.85 | 0.732 | 0.693 | 0.680 | 0.653 | 0.640 |
| F | 10.80 | 0.731 | 0.730 | 0.730 | 0.726 | 0.726 |
| Q | 20.00 | 0.725 | 0.719 | 0.716 | 0.703 | 0.690 |
| R | 20.00 | 0.726 | 0.717 | 0.714 | 0.701 | 0.684 |
| S | 20.00 | 0.725 | 0.718 | 0.715 | 0.701 | 0.689 |
| T | 20.00 | 0.725 | 0.718 | 0.718 | 0.705 | 0.691 |
| U | 10.00 | 0.731 | 0.712 | 0.704 | 0.688 | 0.679 |
| V | 10.00 | 0.731 | 0.730 | 0.727 | 0.726 | 0.726 |

We claim:

1. A method of increasing stability of pregnant liquor of a Bayer process comprising:
   adding to a primary settler feed of a Bayer process a linear or branched polyol having a molecular weight of from 500 to 1,000,000, wherein the linear or branched polyol is a polyglycerol.

2. The method of claim 1, wherein the linear or branched polyol is at a concentration of no less than 0.1 ppm.

3. The method of claim 1, wherein the linear or branched polyol is in an amount of 0.1 to 100 ppm.

4. The method of claim 1, wherein the linear or branched polyol has a molecular weight of from 1,000 to 50,000.

5. The method of claim 1, wherein the linear or branched polyol contains 5 to 30 milliequivalents of hydroxyl units per gram of active polymer.

6. The method of claim 1, wherein the linear or branched polyol contains 8 to 18 milliequivalents of hydroxyl units per gram of active polymer.

* * * * *